(12) United States Patent
Kushnick

(10) Patent No.: US 7,606,849 B2
(45) Date of Patent: Oct. 20, 2009

(54) METHOD AND APPARATUS FOR IMPROVING THE FREQUENCY RESOLUTION OF A DIRECT DIGITAL SYNTHESIZER

(75) Inventor: Eric Barr Kushnick, Santa Clara, CA (US)

(73) Assignee: Advantest Corporation, Ora-Gun (JP)

( * ) Notice: Subject to any disclaimer, the term of this patent is extended or adjusted under 35 U.S.C. 154(b) by 682 days.

(21) Appl. No.: 10/842,746

(22) Filed: May 10, 2004

(65) Prior Publication Data

US 2005/0248374 A1    Nov. 10, 2005

(51) Int. Cl.
    *G06F 1/02* (2006.01)
(52) U.S. Cl. .................................................. 708/271
(58) Field of Classification Search .......... 708/270–277
    See application file for complete search history.

(56) References Cited

U.S. PATENT DOCUMENTS

| 5,694,377 A | * | 12/1997 | Kushnick | 368/120 |
| 5,898,325 A | * | 4/1999 | Crook et al. | 708/271 |
| 7,034,624 B1 | * | 4/2006 | Gentile | 331/34 |
| 2005/0003785 A1 | * | 1/2005 | Jackson et al. | 455/260 |

FOREIGN PATENT DOCUMENTS

| EP | 0 443 242 A | 8/1991 |
| EP | 0 493 057 A | 7/1992 |

OTHER PUBLICATIONS

Analog Devices data sheet; AD9954; 400 MSPS 14Bit, 1.8 V CMOS—Direct Digital Synthesizer; 2003 (cover sheet plus pp. 1-36).

* cited by examiner

*Primary Examiner*—Chat C Do
(74) *Attorney, Agent, or Firm*—Morrison & Foerster LLP

(57) ABSTRACT

The present invention is directed to the use of a DDS to generate a high purity reference signal with high frequency resolution by switching a frequency tuning word (FTW) between particular values for particular time durations to produce two or more closely spaced frequencies that appear at the DDS output as a single frequency. Given a DDS switching between F1 and F2 such that F1 is present for time T1 and F2 is present for time T2, with the total period of the repeating pattern being T=T1+T2, in order for the output of the DDS to produce a single high-purity frequency that is the time-weighted average of the alternating frequencies, the condition $|F1-F2| << \pi/T$ must be satisfied. The time-weighted average frequency $Favg = (T1 \cdot F1 + T2 \cdot F2)/(T1+T2)$. By an appropriate choice of T1 and T2, Favg can be set to any frequency between these two frequencies.

9 Claims, 11 Drawing Sheets

METHOD AND APPARATUS FOR IMPROVING THE FREQUENCY RESOLUTION OF A DIRECT DIGITAL SYNTHESIZER

FIELD OF THE INVENTION

This invention relates to the generation of a high purity reference signal with high frequency resolution, and more particularly, to using a direct digital synthesizer (DDS) to generate a high purity reference signal with high frequency resolution by switching a frequency tuning word (FTW) between particular values for particular time durations to produce two or more closely spaced frequencies that appear at the DDS output as a single frequency.

BACKGROUND OF THE INVENTION

Semiconductor devices, especially analog or mixed-signal devices, often require an external crystal or other high purity source to provide a high purity reference signal to the device. This reference signal may be multiplied internally to a higher frequency that may be used to detect an RF waveform and/or provide clocks to other sections of the device.

When such a semiconductor device is being tested in a test system, it is often impractical to replicate the crystal or high purity source on a loadboard of the test system to provide the reference signal to the device under test (DUT). It is generally preferable to substitute the crystal or other high purity source with a high purity reference generator, controllable by the test system, so that the test system does not have to synchronize to the crystal reference.

FIG. 1 illustrates an exemplary block diagram of a high level perspective of an open architecture test system 100 that may be used to provide the controllable reference signal described above. In FIG. 1, the modules 102 may be functional units such as a reference generator, a digital pincard, an analog card, a device power supply (DPS), or instruments such as a waveform generator. The physical connections to the modules 102 may be obtained through a module connection enabler 104 that includes a switch matrix network 106. The switch matrix network 106 may include logic, traces, and pins.

The system controller 108 is typically the point of interaction for a user. The system controller 108 provides a gateway to the site controllers 110 and synchronization of the site controllers 110 in a multi-site/multi-DUT environment. The system controller 108 and multiple site controllers 110 may operate in a master-slave configuration. The system controller 108 controls the overall system operation and determines that functions that a particular site controller 110 should perform. Each site controller 110 is itself sufficient to test a DUT 112. The site controller 110 controls and monitors the operation of various modules 102 within a test site 114. A test site 114 is a collection of modules 102 that service the testing of a single DUT 112. A site controller 110 can control one or multiple test sites 114.

As described above, the high purity reference signal may be supplied from a reference generator module (one of the modules 102) in the site controller 110. The reference generator module may generate a stable and pure frequency over a range such as 1 MHz to 40 MHz, for example. Because some DUTs may need a high purity reference signal with a resolution of 0.1 Hz or finer, the reference generator module must additionally provide the high purity reference signal with a very fine frequency resolution.

DDSs have been employed to provide the desired reference signal. A DDS is a device that typically outputs a digitally generated sine or cosine wave at a frequency determined by a digitally input FTW (Frequency Tuning Word) and an accurate clock. FIG. 2 illustrates a block diagram of an exemplary conventional DDS 200. In a conventional DDS, an N-bit FTW 202 is provided to an adder 208 in a phase accumulator 210 at a given point in time. The FTW 202 does not change except to change frequencies, such as when tuning the reference generator to a new frequency, or for frequency shift keying (FSK) modulation. The FTW 202 represents the incremental amount (phase increment) or degree of phase being advanced during each period of clock 204 for the waveform being generated. (Frequency is the change of phase per unit time, so the FTW literally is the phase increment needed at each clock cycle to produce the desired output frequency.) The total accumulated degree of phase is summed in the adder 208 and stored in a register 206 at each clock 204 and converted to a particular amplitude value by a memory or other device 212 to generate the desired waveform. For example, a sine wave may be reproduced by adding (in the adder 208) a certain incremental degree of phase (represented by the FTW 202) to the total accumulated degree of phase stored in register 206 at each period of clock 204, and converting the total accumulated degree of phase at each clock to an amplitude value by using the total accumulated degree of phase to address a lookup table in memory 212.

In some DDS designs, only one quarter of the amplitude values are stored in memory, and other techniques are employed to determine the quadrant of the total accumulated phase. Depending on which quadrant is identified, the address into the table, the polarity of the output of the table, or both may be modified to generate the proper amplitude. However, the amplitude values for half of the period or all of the period could also be stored. Additionally, if a waveform other than a sine wave is desired, such as a multi-tone waveform that produces two or more tones, different amplitude values would be stored in the table. Another common practice is to have two phase to amplitude converters, one for a sine wave and one for a cosine wave (sine and cosine are phase shifted by 90 degrees with respect to each other). In such an implementation, one phase accumulator addresses the phase to amplitude converters, and two outputs are provided, one for the sine wave and one for the cosine wave.

When one complete period of the desired waveform has been generated, 360 degrees of phase will have been added, the total accumulated degree of phase stored in register 206 will exceed $2^N-1$, the phase accumulator 210 will overflow, and the total accumulated phase (and thus the value in the register 206) becomes zero or close to zero again. Note that the total accumulated phase in register 206 is not zeroed out after an overflow. Instead, accumulation continues from the remainder left in the register 206. This keeps the phase of the generated waveform continuous so there are no jumps or discontinuities in the generated waveform.

Note that not all of the bits in register 206 may be used to address the memory. Only the most significant M bits of the register 206 may be sent to the lookup table stored in memory 212 to translate each phase value to an amplitude value. If the translation table is a single cycle of a sine or cosine wave, then each time the phase accumulator 210 overflows, approximately one cycle of a sine or cosine wave has been sent to the digital-to-analog (D/A) converter 214. In this case, $$F_O = [FTW/(2^N)] \times Fclk,$$

where Fclk is the clock frequency of clock 204 and $F_O$ is the DDS output frequency 216. This equation holds because FTW divided by $2^N$ provides the inverse of the number of FTWs that must be added before an overflow will occur, and this ratio is the fraction of the period consumed at each clock period. When this ratio is multiplied by the clock frequency Fclk, $F_O$ is obtained.

The frequency resolution of a conventional DDS depends on the frequency of clock 204, the number of bits N fed back around to the adder 208 in the phase accumulator 210, the number of bits N in the FTW, and the pattern loaded into the phase-to-amplitude look-up table stored in memory 212. (Usually, the number of bits fed back and the number of bits in the FTW are the same.) In one example, if the FTW is a logic one, and this is accumulated every clock cycle, a low frequency sine wave will result. If the FTW is thereafter changed to logic two, the next lowest frequency will be produced, and the difference between the two frequencies is the frequency resolution of the DDS. The frequency resolution, or smallest possible increment in the DDS output frequency, is given by:

$$\Delta F_{Omin}=[1/(2^N)] \times Fclk. \quad\quad (EQ.\ A)$$

The DDS 200 of FIG. 2 is similar to a digital arbitrary waveform generator (AWG), because the DDS 200 has a memory 212 that feeds a D/A 214, and a device (the phase accumulator 210) to address the memory 212. As with any digital AWG, the DDS 200 of FIG. 2 produces a fundamental frequency and aliases that occur at multiples of the clock frequency plus or minus the fundamental frequency. In general, aliasing will occur for FTW values greater than $2^{(N-1)}$. The amplitudes of the aliases are reduced from the fundamental frequency. In conventional DDSs, bandpass or lowpass filters are used to preserve the desired frequency while filtering out all other frequencies.

There exists at least one older commercially available DDS with a 48-bit FTW. The 48-bit FTW provides the DDS with a high degree of resolution. However, the older DDS is generally more expensive, consumes more power, gets hotter, and takes up more space than a newer commercially available DDS that has fewer bits. The Analog Devices AD9954 is an example of a next generation 32-bit DDS that has less frequency resolution but is generally less expensive, consumes less power, is cooler, runs faster, and takes up less space than the older DDS.

Thus, there is a need to generate a reference signal with high frequency resolution from a DDS with a lesser inherent degree of frequency resolution as determined by the number of bits in the FTW and the clock frequency.

SUMMARY OF THE INVENTION

The present invention is directed to the use of a DDS to generate a high purity reference signal with high frequency resolution by switching a frequency tuning word (FTW) between particular values for particular time durations to produce two or more closely spaced frequencies that appear at the DDS output as a single frequency. Switching between two or more closely spaced frequencies in a repeating pattern results in higher frequency resolution that could otherwise be obtained from the DDS.

Given a DDS switching between F1 and F2 such that F1 is present for time T1 and F2 is present for time T2, with the total period of the repeating pattern being T=T1+T2, in order for the output of the DDS to produce a single high-purity frequency that is the time-weighted average of the alternating frequencies, the following condition must be satisfied:

$$|F1-F2|<<\pi/T$$

If this condition is not satisfied, then separate peaks will appear at each of the alternating frequencies. In addition, because the height of the sidebands is proportional to the frequency spacing, as the frequency spacing decreases, the undesired sideband amplitudes decrease.

The average frequency is the total number of cycles occurring in a length of time divided by that length of time. In particular, the number of cycles of F1 in T1 is T1·F1. The number of cycles of F2 in T2 is T2·F2. The total amount of time taken to produce T1·F1+T2·F2 cycles is T1+T2. Therefore, the average frequency is $$Favg=(T1 \cdot F1+T2 \cdot F2)/(T1+T2).$$

By an appropriate choice of T1 and T2, Favg can be set to any frequency between these two frequencies and the DDS frequency resolution can be improved by an arbitrary amount.

Periodic switching of the FTW may be implemented by adding a FTW memory to the basic DDS, and filling the memory with FTW 1 and FTW 2 in the desired ratio. The memory can then be continually addressed by an address generator in a circular fashion (adr0, adr1, . . . , adrN, adr0, adr1, . . . ) to produce the DDS frequency. Alternative embodiments may employ two separate registers, a multiplexer to switch between the two registers and a timer to determine when the registers should be switched, and the like. In further alternative embodiments, the FTW can be switched so that the DDS alternates between three or four or more frequencies. The composite output frequency $F_O$ would be the average of the frequencies (taking into account the duration of each). In yet another alternative embodiment, the durations of F1 and F2 may be broken up within a given time T. The DDS still generates F1 for a duration T1 within period T, but T1 is broken up into T1A, T1B and T1C, where T1=T1A+T1B+T1C, and the DDS still generates F2 for a duration T2 within period T, but T2 is broken up into T2A, T2B and T2C, where T2=T2A+T2B+T2C. The composite output frequency $F_O$ will be the average of the frequencies (taking into account the duration of each). When multiple durations are utilized, the period T is effectively reduced, and thus the sidebands appear farther from the peak and with a lower amplitude because the energy is spread out over more of the spectrum.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

In addition, it should be understood that although the present invention is described herein in the context of a test system for purpose of illustration only, embodiments of the present invention are applicable in any context where a DDS is used to generate a high purity reference signal with high frequency resolution, such as in radio receivers and transmitters, bench type test equipment, other laboratory equipment, etc. Its use as a test system reference generator is just one example, and should not be interpreted as limiting the area of use of the invention.

Embodiments of the present invention are directed to the use of a DDS to generate a high purity reference signal with high frequency resolution by switching a frequency tuning word (FTW) between particular values for particular time durations in a phase-continuous manner to produce two or more closely spaced frequencies that appear at the DDS output as a single frequency. Switching between two or more closely spaced frequencies in a repeating pattern results in higher frequency resolution that could otherwise be obtained from the DDS. The frequency spacing of the closely spaced frequencies, the time duration of each frequency within one period of the repeating pattern, and the period of the repeating pattern are all relevant to the generation of the high purity reference signal with high frequency resolution.

Figure 3:
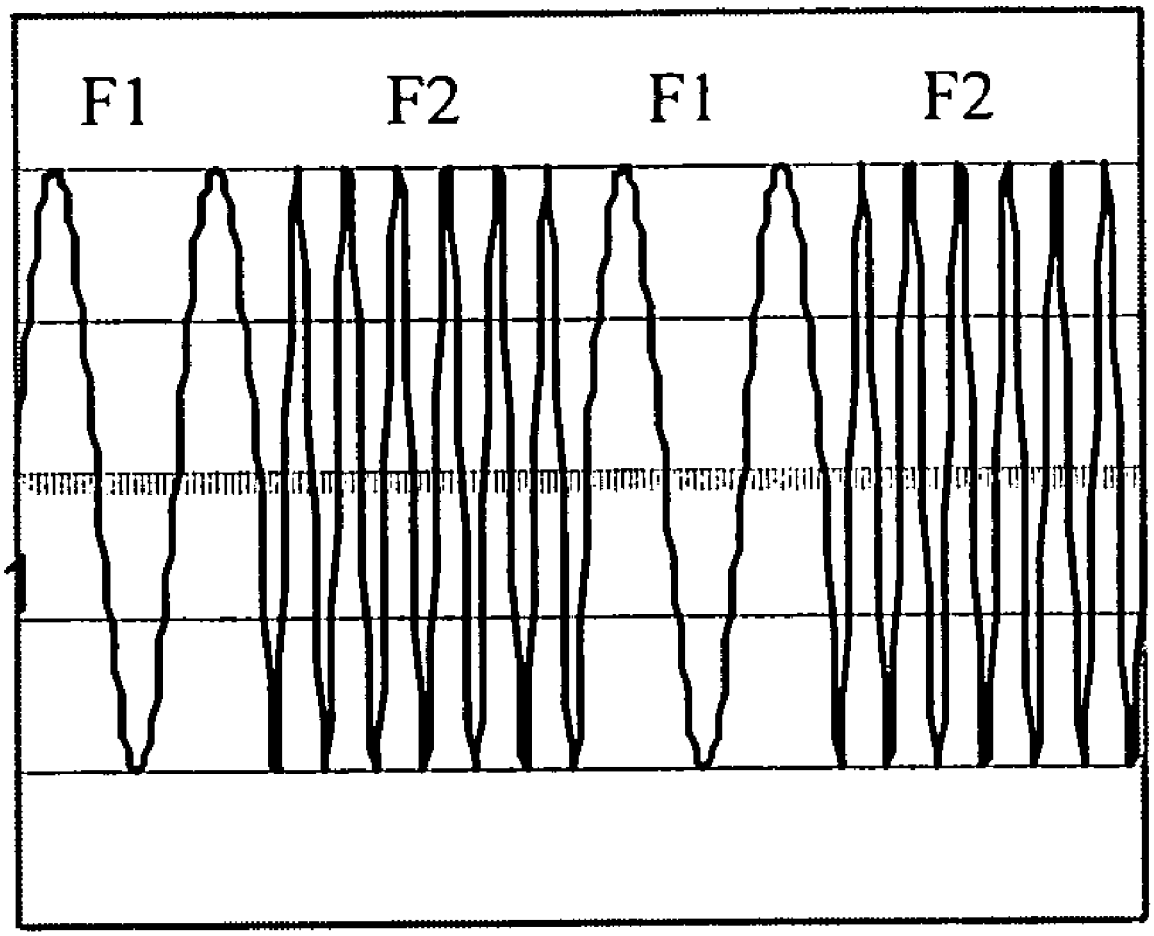
FIG. 3 is an exemplary waveform diagram that illustrates a DDS switching between F1 and F2 such that F1 is present for time T1 and F2 is present for time T2, with the total period of the output being T=T1+T2.
Figure 3:
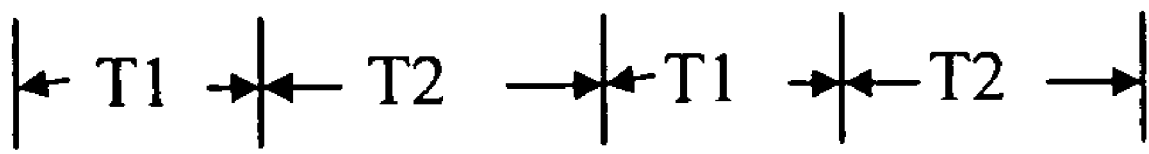

FIG. 3 shows an example of a DDS output switching between two different closely spaced frequencies in a phase-continuous manner according to embodiments of the present invention. In particular, FIG. 3 is an exemplary waveform diagram that illustrates a DDS switching between F1 and F2 such that F1 is present for time T1 and F2 is present for time T2, with the total period of the repeating pattern being T=T1+T2. To analyze this waveform in the time domain, note that the number of zero crossings occurring over a particular period of time determines the average frequency. In particular, the average frequency is the total number of cycles occurring in a length of time divided by that length of time. During this length of time, the frequency may have been switching between two or more values or gradually shifting in frequency, but nevertheless the average frequency is still the number of cycles divided by the total time. In particular, the number of cycles of F1 in T1 is T1·F1. The number of cycles of F2 in T2 is T2·F2. The total amount of time taken to produce T1·F1+T2·F2 cycles is T1+T2. Therefore, the average frequency is $$F\text{avg}=(T1 \cdot F1+T2 \cdot F2)/(T1+T2).$$

In the special case where T1=T2, then Favg=(F1+F2)/2. The equation for the average output frequency, Favg, holds for any values of F1 and F2. F1 and F2 can be chosen to be frequencies corresponding to FTWs that differ by only one LSB, the frequency resolution of the DDS. By an appropriate choice of T1 and T2, Favg can be set to any frequency between these two frequencies and the DDS frequency resolution can be improved by an arbitrary amount.

Figure 1:
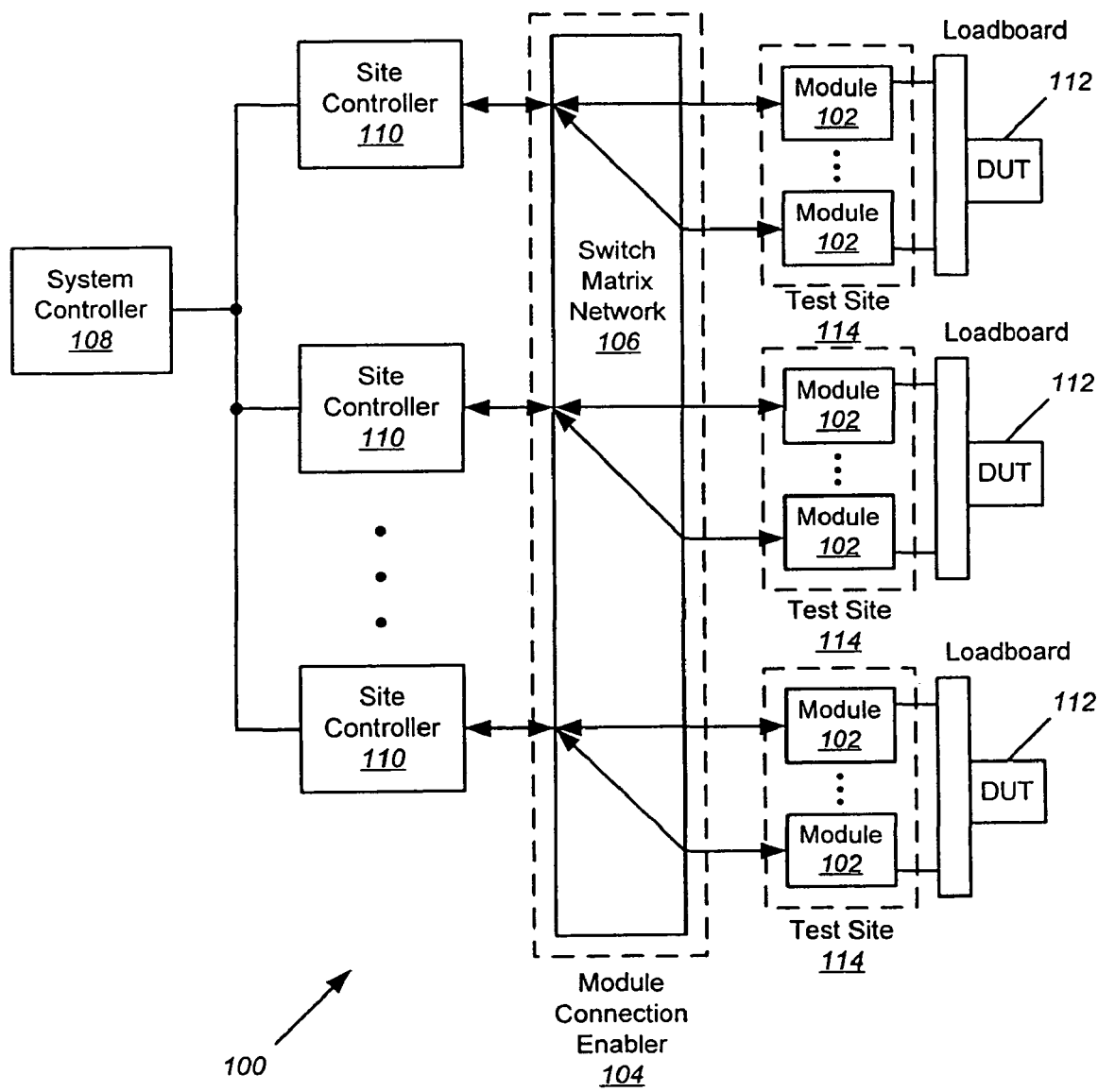
FIG. 1 illustrates an exemplary block diagram of a high level perspective of an open architecture test system.
Figure 2:
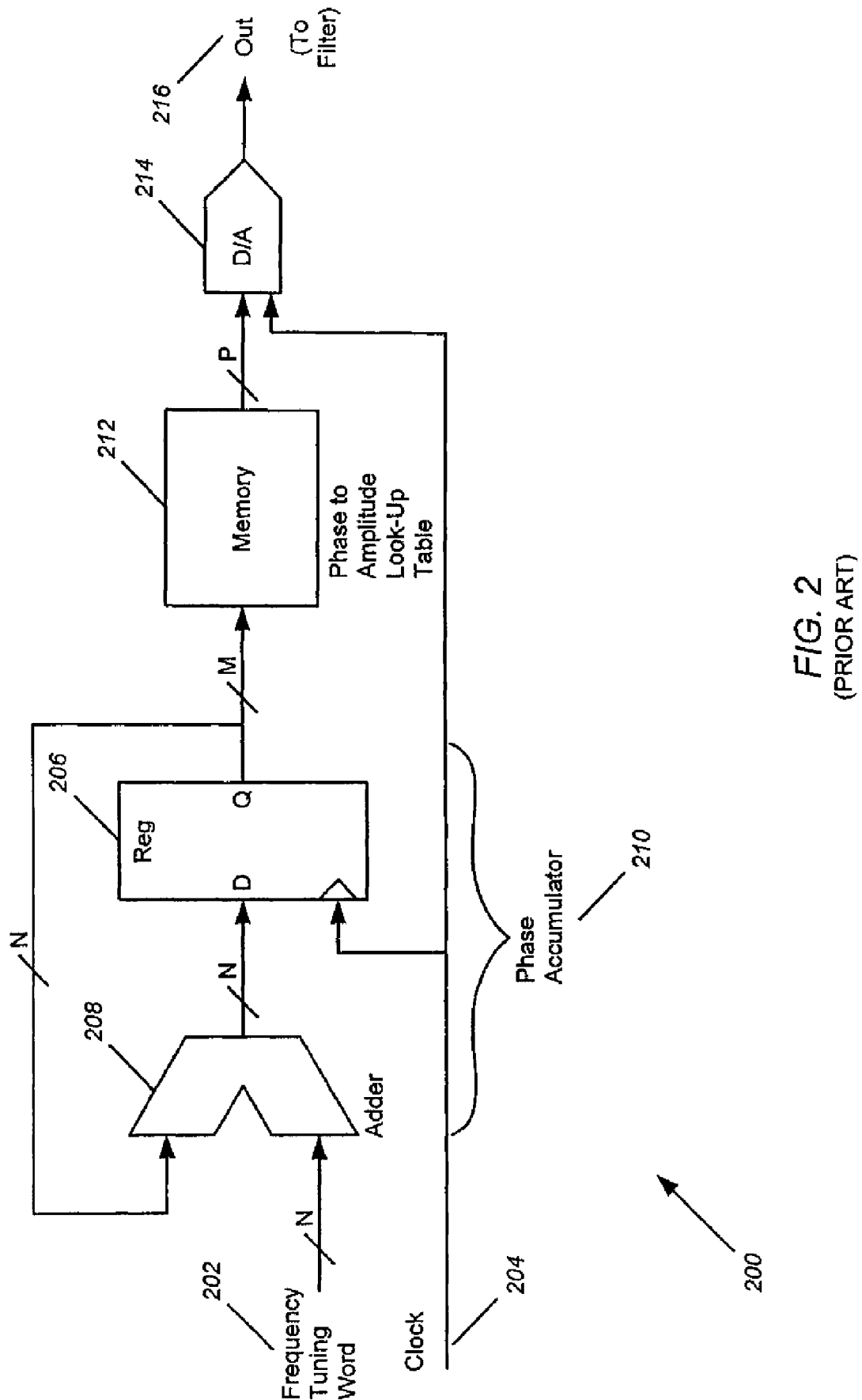
FIG. 2 illustrates a block diagram of an exemplary conventional DDS.

Note that the DDS as implemented in embodiments of the present invention is phase-continuous; that is, the phase does not change and no discontinuities appear in the waveform when the frequency is changed. If the register 206 in FIG. 2 is reset when the frequency is changed, or when the register 206 overflows, a discontinuity would occur in the waveform and another peak will appear in the Fourier spectrum.

Figure 11A:
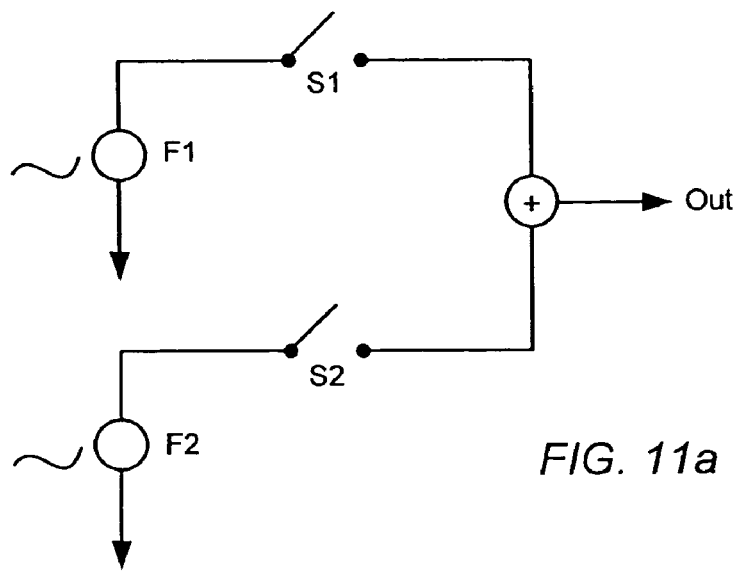
FIGS. 11*a* through 11*c* illustrate an example of the waveform that occurs when switching between two independent frequency sources F1 and F2 in a non-phase-continuous manner. The Fourier spectrum of this signal is entirely different than that of the present invention.
Figure 11B:
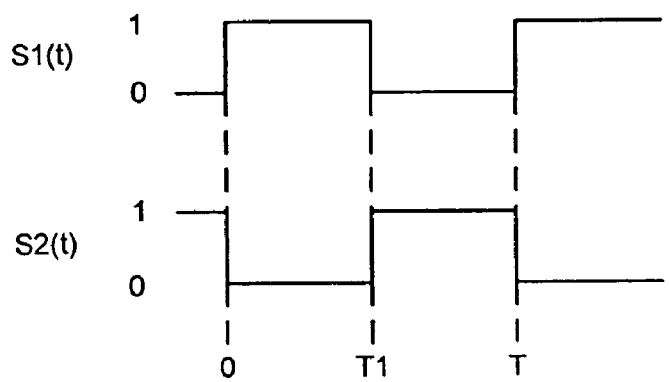
Figure 11C:
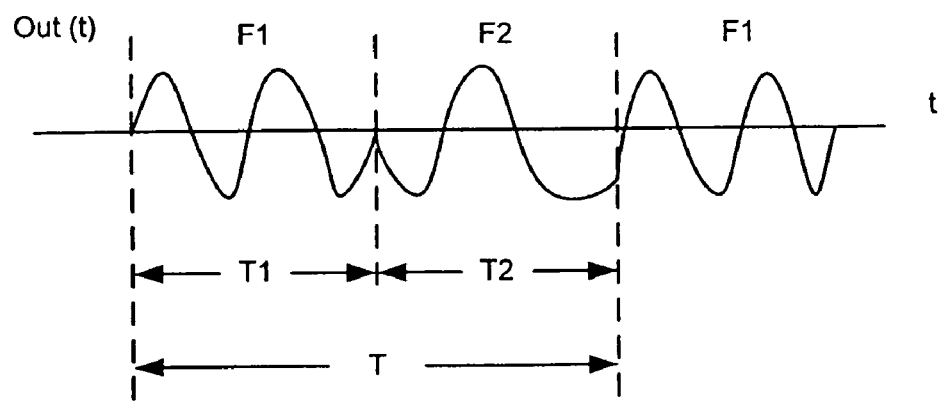

FIGS. 11*a* through 11*c* illustrate an example of the waveform and Fourier spectrum that occur when switching between two independent frequency sources F1 and F2 in a non-phase-continuous manner. In FIG. 11*a*, two independent frequency sources F1 and F2 are always running, and switches S1 and S2 are controlled to periodically switch between them. FIG. 11*b* illustrates switch waveforms S1(t) and S2(t) for S1 and S2 for switching between F1 and F2 in time period T. Referring again to FIG. 11*a*, the outputs of the switches are added together to produce Out. FIG. 11*c* illustrates the resultant output Out(t), where:

$$\text{Out}(t) = A \cdot \sin(2\pi \cdot F1 \cdot t) \cdot S1(t) + A \cdot \sin(2\pi \cdot F2 \cdot t) \cdot S2(t)$$
$$= A \cdot \sin(2\pi \cdot F1 \cdot t) \cdot S1(t) + A \cdot \sin(2\pi \cdot F2 \cdot t) \cdot (1 - S1(t))$$

where A is an arbitrary constant proportional to the amplitude of the signal. By Fourier analysis on S1(t), $$\text{Out}(t) = A \cdot (T1/T) \cdot \sin(2\pi \cdot F1 \cdot t) + A \cdot (T2/T) \cdot \sin(2\pi \cdot F2 \cdot t) + \sum_{k=1}^{\infty} \{+/-c'_k \cdot \sin((2\pi \cdot (F1 +/-(k/T)) \cdot t) + d'_k \cdot \cos((2\pi \cdot (F1 +/-(k/T)) \cdot t)\} + $$
$$-\sum_{k=1}^{\infty} \{+/-c'_k \cdot \sin((2\pi \cdot (F2 +/-(k/T)) \cdot t) + d'_k \cdot \cos((2\pi \cdot (F2 +/-(k/T)) \cdot t)\},$$

where $c_k'$ and $d_k'$ are constants derived from the coefficients of the Fourier series expansion for S1(t).

From these equations, it is evident that there are always two distinguishable main frequencies in the output spectrum at F1 and F2, regardless of how close in frequency F1 is to F2. Additionally, there are two series of sidebands, one at multiples of +/−(1/T) away from F1, and the other at multiples of +/−(1/T) away from F2. The relative amplitudes of F1 and F2 are affected by the ratio of T1/T.

This shows the importance of the phase accumulation of the DDS in producing an output that has only one main spectral line at Favg. When switching between two frequencies that are close to each other, in general, a single main spectral line at the average frequency is not necessarily produced. It is the phase accumulation, or phase continuous switching, of the DDS that allows the equations to produce a single main spectral line when periodically switching frequencies.

Figure 4:
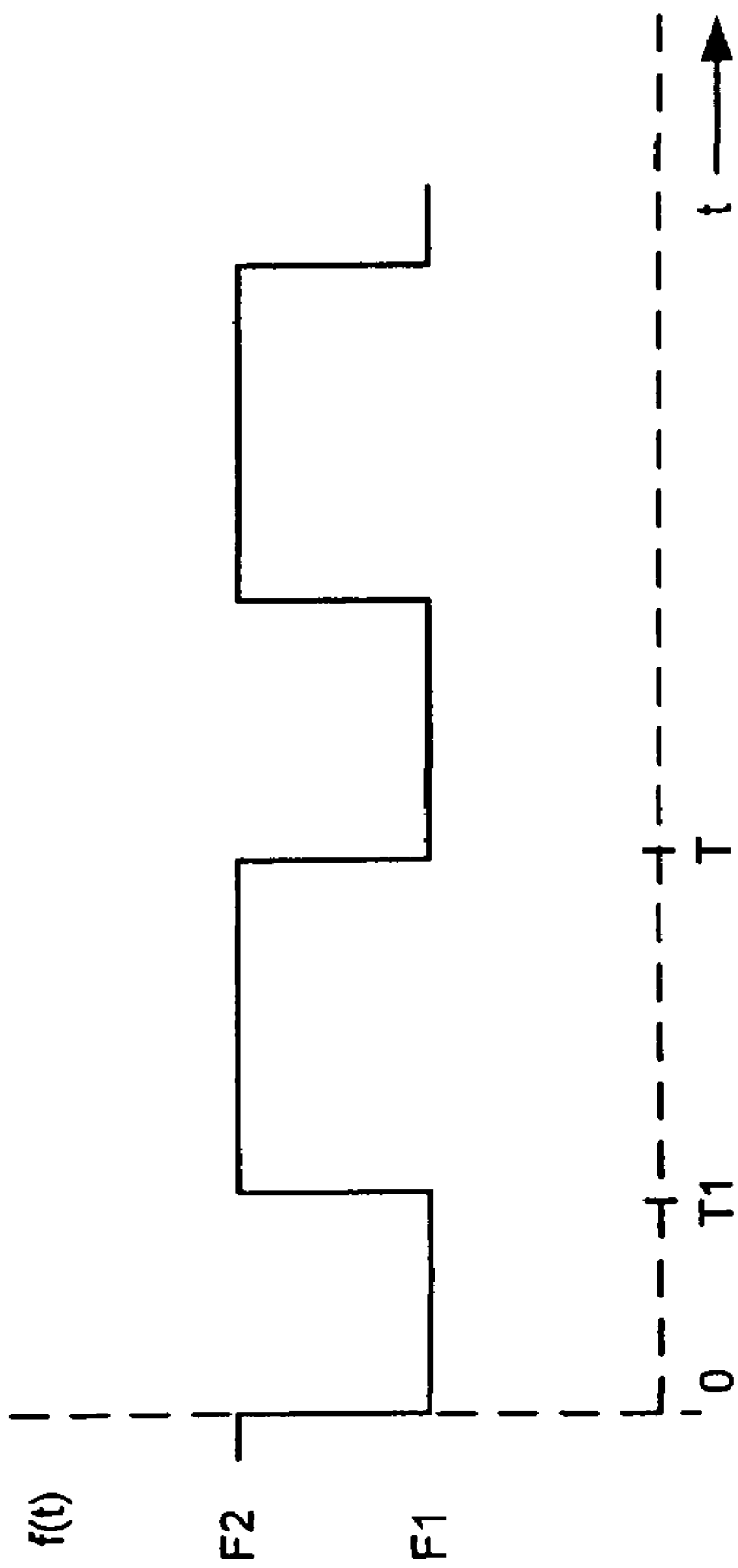
FIG. 4 is an exemplary timing diagram that is an alternative way to illustrate a DDS switching between F1 and F2 such that F1 is present for time T1 and F2 is present for time T2, with the total period of the output being T=T1+T2.

FIG. 4 is an exemplary timing diagram that is an alternative to FIG. 3 to illustrate a DDS switching between F1 and F2 such that F1 is present for time T1 and F2 is present for time T2, with the total period of the repeating pattern being T=T1+T2, according to embodiments of the present invention.

Figure 5:
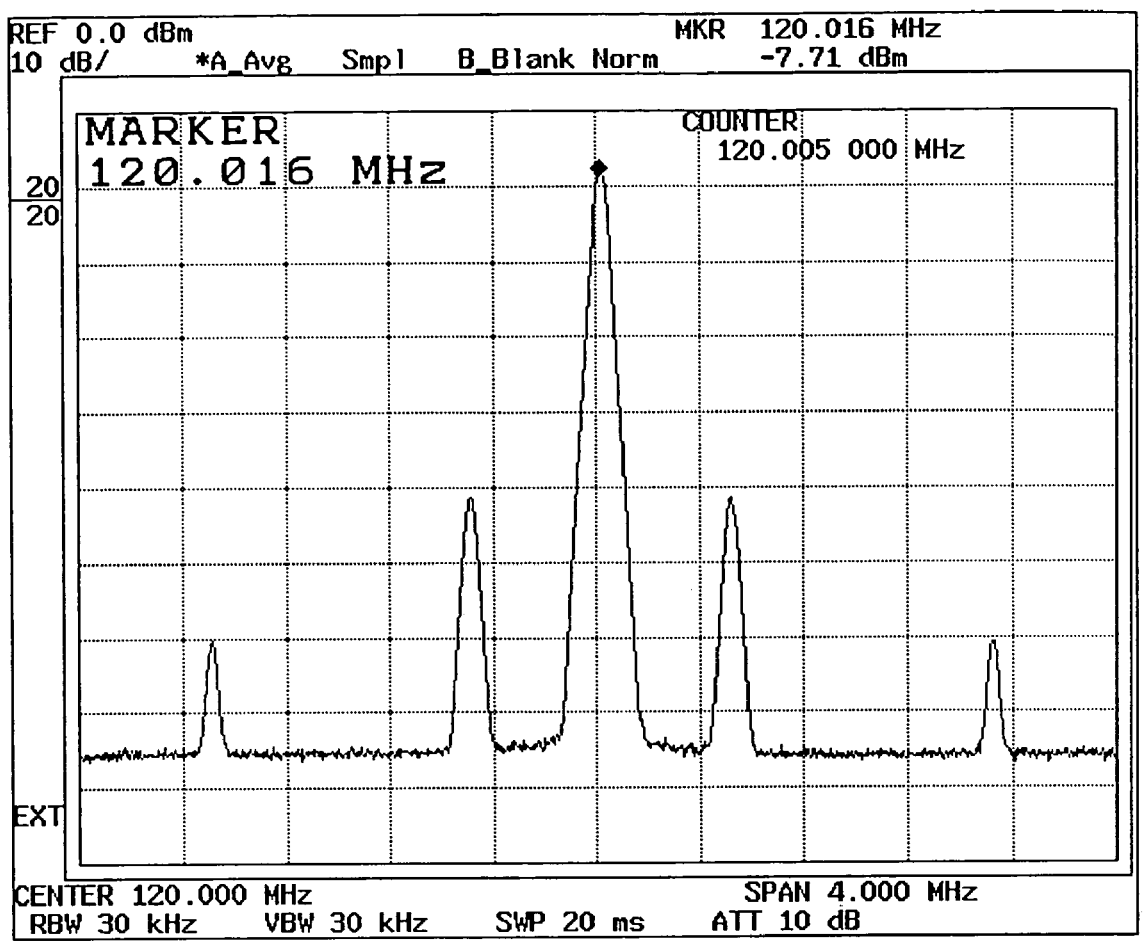
FIG. 5 is an exemplary Fourier spectrum illustrating the single peak and sidebands that are formed when a DDS is switched between two closely spaced frequencies according to embodiments of the present invention. A comparatively large frequency spacing between F1 and F2 is used for purposes of illustration.

When the FTW switches between two or more values so that the DDS output switches between two or more closely spaced frequencies F1 and F2 in a phase-continuous manner, the output of the DDS will appear to be a single frequency that is the time-weighted average of the frequencies. If a Fast Fourier Transform (FFT) of the DDS output is performed, the DDS output will appear as illustrated in the example Fourier spectrum of FIG. 5, with a peak at the average frequency, and first and third sidebands on either side of the peak spaced multiples of 1/T away from the peak. The distinct sidebands in the example Fourier spectrum of FIG. 5 are produced for purposes of illustration only. As will be discussed herein, embodiments of the present invention are capable of producing a reference signal frequency with sidebands that are down in the noise floor.

In order for the output of the DDS to produce a single high-purity frequency that is the time-weighted average of the alternating frequencies, the frequencies must be spaced much closer together than π/T. In other words, the following condition must be satisfied:

$$|F1-F2| << \pi/T$$

By bringing the two frequencies closer together than π divided by the repetition period T, rather than have a frequency spectrum with two distinct peaks, there is only one peak at the average frequency. In addition, because the height of the sidebands is proportional to the frequency spacing, as the frequency spacing decreases, the undesired sideband amplitudes decrease. If this condition is not satisfied, then separate peaks will appear at each of the alternating frequencies.

In the example of FIG. 5, F1=120 MHz and F2=120.01 MHz, and the frequencies are switched in a squarewave pattern with T1=T2=1 us, thus T=2 us. Because the above-identified condition is satisfied, only one peak is present at 120.005 MHz (the average of F1 and F2 ), and first sidebands are present at 119.505 MHz and 120.505 MHz, which is 1/T from the peak. Because the durations of F1 and F2 happen to be equal in this example, the second sidebands disappear. Note that the 10 kHz spacing in the example of FIG. 5 is many orders of magnitude greater than the spacing in a practical use of the present invention, which is on the order of 1 Hz or less. With 1 Hz spacing, the sidebands will be in the noise floor.

As noted above, in the example of FIG. 5 the durations T1 and T2 were equal. However, in embodiments of the present invention, the duration of the frequencies can be changed such that, for example, instead of F1 and F2 each being active for 1 us, F1 can be active for 1.25 us and F2 for 0.75 us, and then the single peak would be at 120.00375 MHz, which is the time-weighted average of the two frequencies. Thus, by varying the duration of the frequencies, the output frequency of the DDS can be altered with fine resolution.

Figure 6:
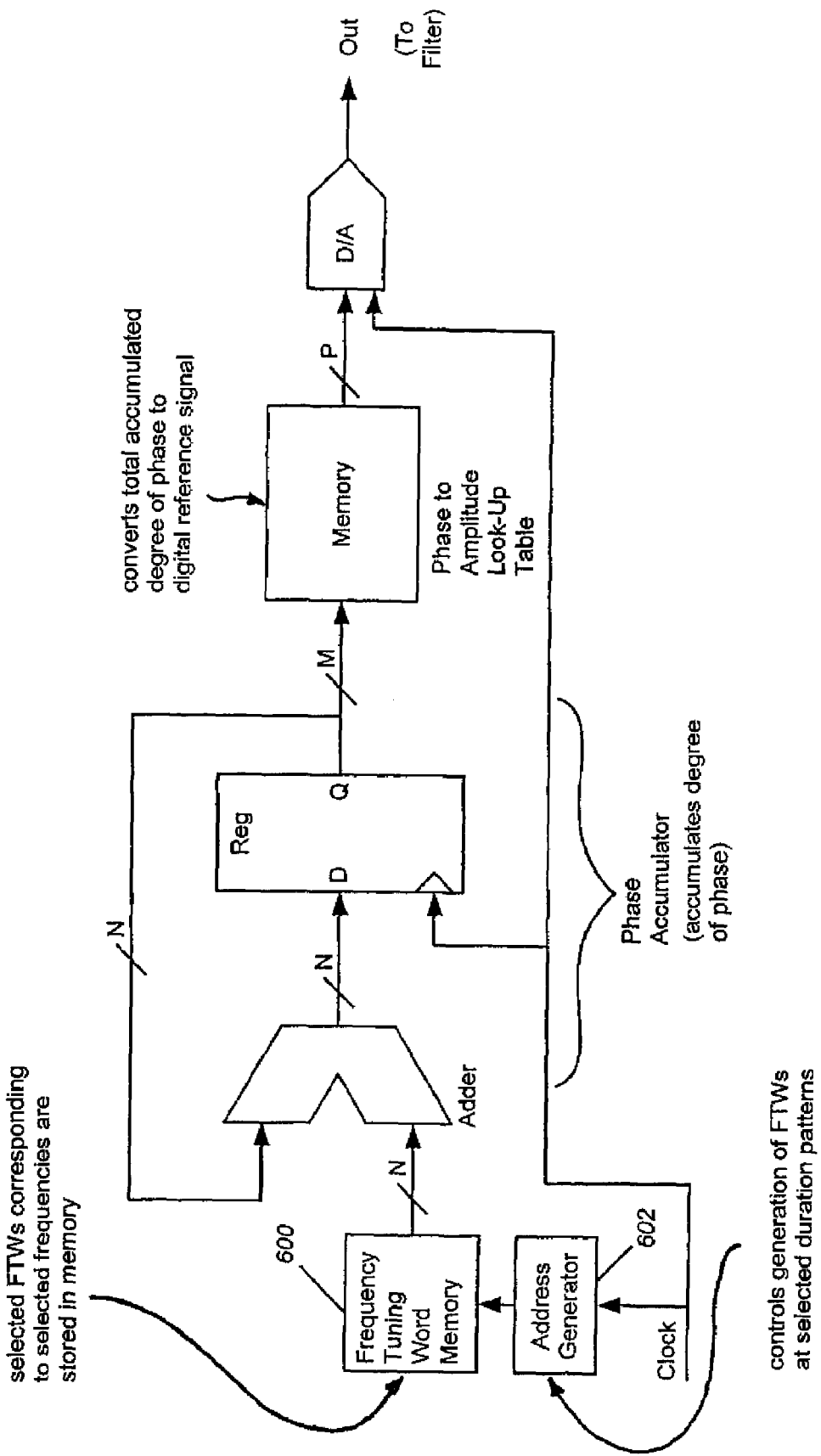
FIG. 6 illustrates a block diagram of an exemplary DDS according to embodiments of the present invention.

In embodiments of the present invention illustrated in FIG. 6, periodic switching of the FTW may be implemented by adding a FTW memory or other storage device 600 to the basic DDS, and filling the memory with FTW 1 and FTW 2 in the desired ratio. The memory 600 can then be continually addressed by an address generator or storage device controller 602 in a circular fashion (adr0, adr1, . . . , adrN, adr0, adr1, . . . ) to produce the DDS frequency as shown in FIG. 4. Alternative embodiments of the storage device and controller may include two separate registers, a multiplexer to switch between the two registers and a timer to determine when the registers should be switched, and the like.

In further alternative embodiments, the FTW can be switched so that the DDS alternates between three or four or more frequencies F1 through FN, each represented by FTW1 through FTWN and having a duration T1 through TN within duration T. The composite output frequency Favg would be the time-weighted average of the frequencies:

$$Favg=(T1 \cdot F1+T2 \cdot F2+ \ldots +TN \cdot FN)/(T1+T2+ \ldots +TN).$$

In order for the output of the DDS to produce a single high-purity frequency that is the time-weighted average of the frequencies, the frequencies must be spaced much closer together than π/T. In other words, the largest frequency difference between any two frequencies F1 through FN must be much less than π/T.

Figure 7:
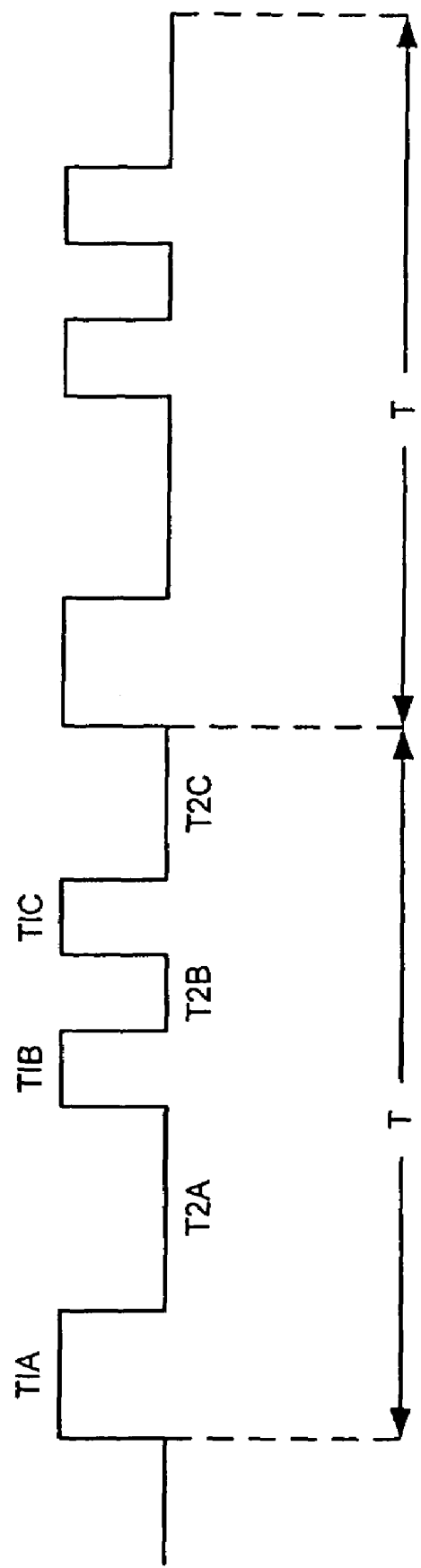
FIG. 7 is an exemplary timing diagram of a DDS switching between F1 and F2 multiple times within a period T such that F1 is present for time T1 and F2 is present for time T2, with the total period of the output being T=T1+T2 according to embodiments of the present invention.

In yet another alternative embodiment of the present invention illustrated in FIG. 7, the durations of F1 and F2 may be broken up into multiple separate time durations within a given time T. As compared with FIG. 3, the DDS still generates F1 for a duration T1 within period T, but T1 is broken up into T1A, T1B and T1C, where T1=T1A+T1B+T1C, and the DDS still generates F2 for a duration T2 within period T, but T2 is broken up into T2A, T2B and T2C, where T2=T2A+T2B+T2C. The composite output frequency $F_O$ will be the average of the frequencies (taking into account the duration of each). Note also that when the durations of FIG. 4 are utilized, the sidebands are spaced 1/T away from the peak, but when the multiple durations of FIG. 7 are utilized, the period T is effectively reduced, and thus the sidebands appear farther from the peak and with a lower amplitude because the energy is spread out over more of the spectrum. Thus, this technique can be used to further reduce sidebands.

Figure 8:
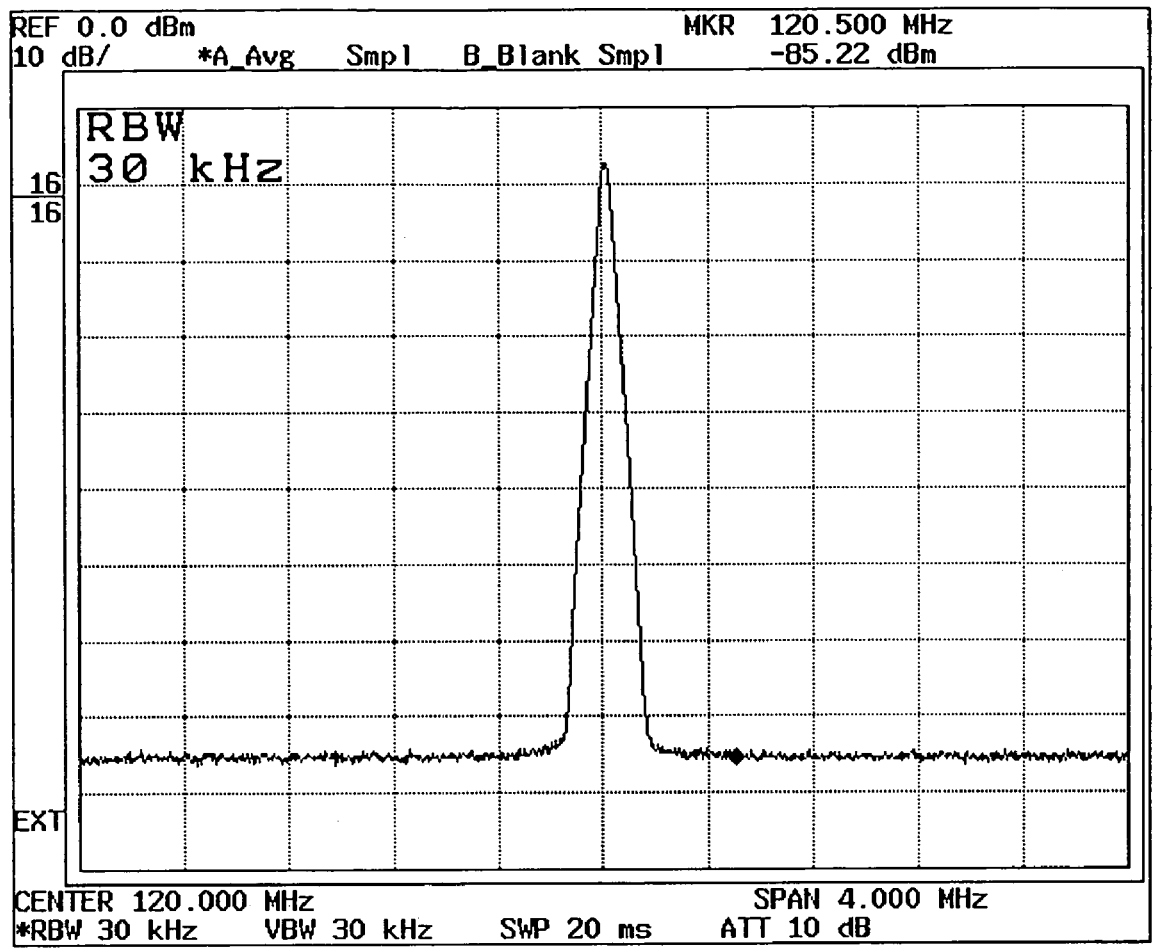
FIG. 8 is an exemplary Fourier spectrum illustrating the single peak and sidebands down in the noise floor that are formed when a DDS is switched between two closely spaced frequencies according to embodiments of the present invention.

FIG. 8 is a more practical example of embodiments of the present invention, where F1 is 120 MHz, F2 is 120.00000009313 MHz, the difference between F1 and F2 is 93.13 milliHz, T1=T2=1 us, and the total period T=2 uS. Note that there are no sidebands visible at 120.5 MHz, because they are in the noise floor.

As described above and illustrated in FIG. 8, in embodiments of the present invention the frequency spacing can be chosen such that a single peak is present at the time-weighted average of the frequencies, and all sidebands are in the noise floor. The previous example of FIG. 5, with large frequency differences between F1 and F2, was provided so the amplitude of the visible sidebands could be verified using the frequency domain analysis and the equations to be described, and vice versa. With the equations verified against FIG. 5, they can be used to determine the amplitude of the sidebands in practical examples such as FIG. 8 in which the sidebands are not visible.

The following frequency domain analysis presumes the phase coherency of DDSs, that a phase accumulator is used, that all N bits are used in the feedback to the adder of the phase accumulator, that the phase to amplitude lookup table in memory is effectively a single cycle of a sine wave, and that the DDS output frequency f(t) periodically switches between two values F1 and F2, as shown in FIG. 4.

A DDS works by accumulating phase and translating that accumulated phase into an amplitude output. In the discrete time domain, this could be represented by $$DDS\_out(n) = A \cdot \sin\left(2\pi \cdot \sum_{k=1}^{n} (FTW)_k / (2^N)\right)$$

where

DDS_out(n) is the DDS output amplitude at clock cycle n;
$(FTW)_k$ is the value of the FTW at clock cycle k;
N is the number of bits in the phase accumulator; and
A is an arbitrary amplitude scaling constant.

In the continuous time domain, with the assumption that the DDS output is low-pass filtered to remove aliases, the analogous equation is $$DDS\_out(t) = A \cdot \sin\left(2\pi \cdot \int_0^t f(\tau) d\tau\right) \quad \text{(EQ. B)}$$

where

DDS_out(t) is the DDS output at time t;
f(τ) is the programmed frequency at time τ—that is $f(\tau) = [(FTW(\tau))/(2^N)] \cdot Fclk$; and
A is an arbitrary amplitude scaling constant.

For a constant FTW, for example, the DDS output becomes simply $$DDS\_out(t) = A \cdot \sin(2\pi f_0 \cdot t)$$

where $f_0 = [(\text{Frequency Tuning Word})/(2^N)] \cdot Fclk$.

The variable f(t) may be represented by its Fourier series:

$$f(t) = a_0 + \sum_{k=1}^{\infty} [a_k \cos((2\pi k/T) \cdot t) + b_k \sin((2\pi k/T) \cdot t)]$$

where $$a_0 = (1/T) \cdot \int_0^T f(t) dt$$
$$= (F1 \cdot T1 + F2 \cdot T2)/T$$
$$= Favg;$$
$$a_k = (2/T) \cdot \int_0^T f(t) \cdot \cos((2\pi k/T) \cdot t) dt$$
$$= (F1 - F2) \cdot [1/(\pi k)] \cdot \sin(2\pi k T1/T); \text{ and}$$
$$b_k = (2/T) \cdot \int_0^T f(t) \cdot \sin((2\pi k/T) \cdot t) dt$$
$$= (F1 - F2) \cdot [1/(\pi k)] \cdot [1 - \cos(2\pi k T1/T)].$$

Substituting the Fourier series expansion of f(t) into EQ. B above, the equation for DDS_out(t) yields, $$DDS\_out(t) = A \cdot \sin\left(2\pi \cdot \int_0^t f(\tau) d\tau\right) \quad \text{(EQ. C)}$$

$$= A \cdot \sin\left(2\pi \cdot \int_0^t \{a_0 + \sum_{k=1}^{\infty} [a_k \cos((2\pi k/T) \cdot \tau) + b_k \sin((2\pi k/T) \cdot \tau)]\} d\tau\right)$$

$$= A \cdot \sin\left(2\pi a_0 \cdot t + 2\pi \cdot \sum_{k=1}^{\infty} \{a_k \cdot [T/(2\pi k)] \cdot \sin((2\pi k/T) \cdot \tau) + -b_k \cdot [T/(2\pi k)] \cdot \cos((2\pi k/T) \cdot \tau)\}|_{\tau=0}^{t}\right)$$

$$= A \cdot \sin\left(2\pi a_0 \cdot t + 2\pi \cdot \sum_{k=1}^{\infty} \{a_k \cdot [T/(2\pi k)] \cdot \sin((2\pi/T) \cdot t) + b_k \cdot [T/(2\pi k)] \cdot [1 - \cos((2\pi k/T) \cdot t)]\}\right)$$

Substituting for $a_0$, $a_k$, and $b_k$, and combining like terms, yields $$DDS\_out(t) =$$
$$A \cdot \sin\left(2\pi F_{avg} \cdot t + (F1 - F2) \cdot (T/\pi) \cdot \sum_{k=1}^{\infty} \{(1/k)^2 \cdot [\sin(2\pi k T1/T) \cdot \sin((2\pi k/T) \cdot t) + [\cos(2\pi k T1/T) - 1] \cdot \cos((2\pi k/T) \cdot t) + [1 - \cos(2\pi k T1/T)]]\}\right).$$

This equation is of the form $$DDS\_out(t) = A \cdot \sin\left(2\pi F_{avg} \cdot t + (F1 - F2) \cdot (T/\pi) \cdot \sum_{k=1}^{\infty} \{a'_k \cdot \sin((2\pi k/T) \cdot t) + b'_k \cdot \cos((2\pi k/T) \cdot t)\} \cdot \Phi_0\right),$$

where $$a'_k = (1/k)^2 \cdot \sin(2\pi k T1/T)$$
$$b'_k = (1/k)^2 \cdot [\cos(2\pi k T1/T) - 1]$$
$$\Phi_0 = (F1 - F2) \cdot (T/\pi) \cdot \sum_{k=1}^{\infty} \{(1/k)^2 \cdot [1 - \cos(2\pi k T1/T)]\}$$

Note that $$\sum_{k=1}^{\infty} (1/k)^2 = \pi^2/6.$$

Also note that $[1 - \cos(2\pi k T1/T)]$ ranges from 0 to 2, depending on the values of T, T1, and k. Therefore, $\Phi_0$ is bounded by 0 and (F1−F2)·T·π/3. The maximum magnitude of $a_k'$ is 1, which can only occur when k=1. The maximum magnitude of $b_k'$ occurs when $b_k'=-2$, which can only occur when k=1. Both $a_k'$ and $b_k'$ fall off as $(1/k)^2$ and diminish rapidly with increasing k.

Now, using the trigonometric identity $$\sin(\alpha + \beta) = \sin\alpha \cdot \cos\beta + \cos\alpha \cdot \sin\beta,$$

let $$\alpha = 2\pi F_{avg} \cdot t + \Phi_0$$

$$\beta = (F1 - F2) \cdot (T/\pi) \cdot \sum_{k=1}^{\infty} \{a'_k \cdot \sin((2\pi k/T) \cdot t) + b'_k \cdot \cos((2\pi k/T) \cdot t)\}.$$

Then, $$DDS\_out(t) = A \cdot \sin(2\pi F_{avg} \cdot t + \Phi_0) \cdot \cos\left((F1 - F2) \cdot (T/\pi) \cdot \sum_{k=1}^{\infty} \{a'_k \cdot \sin((2\pi k/T) \cdot t) + b'_k \cdot \cos((2\pi k/T) \cdot t)\}\right) +$$

$$A \cdot \cos(2\pi F_{avg} \cdot t + \Phi_0) \cdot \sin\left((F1 - F2) \cdot (T/\pi) \cdot \sum_{k=1}^{\infty} \{a'_k \cdot \sin((2\pi k/T) \cdot t) + b'_k \cdot \cos((2\pi k/T) \cdot t)\}\right)$$

No approximations have been made thus far. The above equation is an exact expression for DDS_out(t). For improving the frequency resolution of our DDS, the most practical case is where F1 and F2 are very closely spaced in frequency. If |F1−F2|<<π/T (almost always true in practical cases), then appropriate small angle approximations may be used for sin and cos (that is, sin(x)=x and cos(x)=1 for x<<1). If it is assumed that |F1−F2|<<π/T, then $$DDS\_out(t) \approx A \cdot \sin(2\pi F_{avg} \cdot t + \Phi_0) + A \cdot (F1 - F2) \cdot (T/\pi) \cdot$$

$$\cos(2\pi F_{avg} \cdot t + \Phi_0) \cdot \sum_{k=1}^{\infty} \{a'_k \cdot \sin((2\pi k/T) \cdot t) + b'_k \cdot \cos((2\pi k/T) \cdot t)\}$$

Using the trigonometric relationships $$\cos A \cdot \sin B = \tfrac{1}{2}\sin(A+B) - \tfrac{1}{2}\sin(A-B)$$

$$\cos A \cdot \cos B = \tfrac{1}{2}\cos(A+B) + \tfrac{1}{2}\cos(A-B)$$

DDS_out(t) can be re-written as, $$DDS\_out(t) \approx A \cdot \sin(2\pi F_{avg} \cdot t + \Phi_0) + A \cdot (F1 - F2) \cdot (T/2\pi) \cdot \quad\quad (EQ.\ D)$$

$$\sum_{k=1}^{\infty} \{a'_k \cdot \sin(2\pi(F_{avg} + k/T) \cdot t + \Phi_0) +$$

$$b'_k \cdot \cos(2\pi(F_{avg} + k/T) \cdot t + \Phi_0) +$$

$$-a'_k \cdot \sin(2\pi(F_{avg} - k/T) \cdot t + \Phi_0) +$$

$$b'_k \cdot \cos(2\pi(F_{avg} - k/T) \cdot t + \Phi_0)\}$$

$$a'_k = (1/k)^2 \cdot \sin(2\pi k T1/T)$$

$$b'_k = (1/k)^2 \cdot [\cos(2\pi k T1/T) - 1]$$

where

This equation shows that the DDS output is a sine wave at frequency $F_{avg}$ with a series of sidebands spaced at multiples of $+/-1/T$ from $F_{avg}$. The amplitudes of the sidebands are directly proportional to (F1−F2)·T; for a given T, as (F1−F2) becomes smaller, the sideband amplitudes become smaller.

Because $a_k'$ and $b_k'$ fall off as $(1/k)^2$, only the first few sidebands should be of any consequence. As FIG. 8 illustrates, in a practical DDS implementation all sidebands may be safely ignored.

Note that $\Phi_0$ appears in the final DDS output equation because of the assumption that frequency F1 started from zero phase at t=0 in our derivation. $\Phi_0$ is the phase shift required at frequency $F_{avg}$ to make this assumption true. Had this analysis started with an accumulated phase of $-\Phi_0$ in EQ. B, the $\Phi_0$'s would drop out of the final equation.

For purposes of illustration only, given a 32-bit FTW and a 400 MHz clock, substituting these values into EQ. A for the frequency resolution yields a value close to 93 milliHz, or approximately 0.1 Hz. Using 128 words of FTW memory, the resolution can be improved to less than 1 milliHz.

Referring again to the example of FIG. 5, with F1=120 MHz, F2=120.01 MHz, T=2 us, and f(t) as a squarewave (i.e. T1=½ T), even with the large 10 KHz frequency spacing between F1 and F2, |F1−F2|<<π/T. Applying the conditions of the example of FIG. 5 to EQ. D yields a DDS output at 120.005 MHz, as expected. Note that $a_k'$=0 for all k, and $b_1'$=−2, $b_2'$=0, $b_3'$=−2. The calculated amplitudes of the first and third sideband at Favg+/−500 KHz (i.e., 1/(2 us)) and Favg+/−1.5 MHz (i.e., 3·1/(2 us)) are therefore −43.92 dBc and −63.01 dBc respectively, which is consistent with the sidebands shown in FIG. 5.

Referring again to the example of FIG. 5, with (F1−F2)≈93.13 milliHz, F1−F2|<<π/T. With Fclk=400 MHz and 128 FTW memory addresses, it is convenient to use 2.56 us for the period T of one cycle through the FTW memory. Each address controls the DDS frequency for 20 ns, or 8 DDS clock cycles. Each address is loaded with either F1 or F2, and the final frequency resolution is 728 microHertz. If the memory is loaded with 64 F1 values and 64 F2 values, such that f(t) is a squarewave, then the amplitude of the first sideband is −142.4 dBc. For any practical system, this is negligible and may be completely ignored. If the memory is loaded with only one F1 value and 127 F2 values, then the amplitude of the first sideband is even less, −174.6 dBc.

It should be noted that DDSs have been used as frequency generators in frequency-shift keying (FSK) applications. FSK is a method of transmitting digital signals. The two binary states, logic 0 (low) and 1 (high), are each represented by an analog waveform. Logic 0 is represented by a waveform at one specific frequency (e.g. F1), and logic 1 is represented by a waveform at a different frequency (e.g. F2). In FSK applications, it is desirable to switch between two frequencies in FSK applications to generate two distinct peaks in the frequency domain, each carrying different information. For example, the lower peak in the Fourier spectrum may represent a logic 0 and the upper peak may represent a logic 1. Two frequency peaks are desired because each peak will be present for a certain period of time, and two different filters will be used at the receiving end. A receiver of data transmitted in FSK mode will look within the two frequency bands to determine whether the received signal is in the high or the low band, each representing a logic 1 or 0. In this manner, the received signal will be converted to bits, and data can be received.

Figure 9:
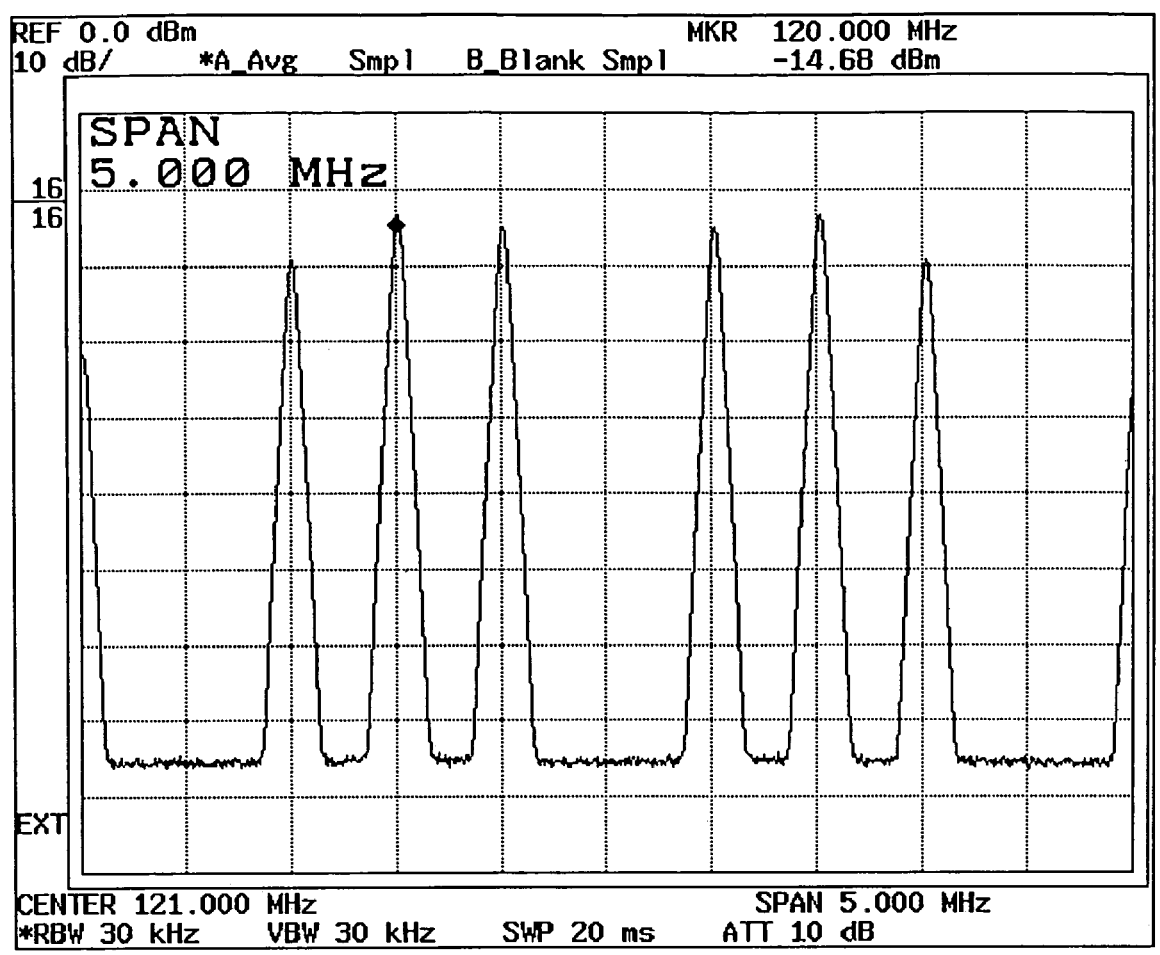
FIG. 9 illustrates an exemplary frequency plot showing two distinct peaks at F1 and F2 surrounded by sidebands in a FSK application.

As shown in the exemplary Fourier spectrum of FIG. 9, if a DDS utilized for FSK applications generates two frequencies F1 at 120 MHz and F2 at 122 MHz, and the frequency is switched between F1 and F2 at a 1 us rate (1 MHz), then the equation |F1−F2|<<π/T is not satisfied, and thus the two desired peaks will appear. In this case, the Fourier spectrum will include two peaks, one at 120 MHz and one at 122 Mhz, and some sidebands. As mentioned above, these peaks are desirable for FSK applications because each peak holds certain information. Although FIG. 9 illustrates a frequency difference between F1 and F2 of 2 MHz for purposes of illustration only, in practical FSK applications, the separation of the two frequencies F1 and F2 may range from a few kHz down to hundreds of Hz, with the period T long enough to ensure the generation of two distinct frequencies. The frequencies cannot be so close together that the two peaks overlap and form a single peak, because if the two peaks overlap, all information will be lost.

Figure 10:
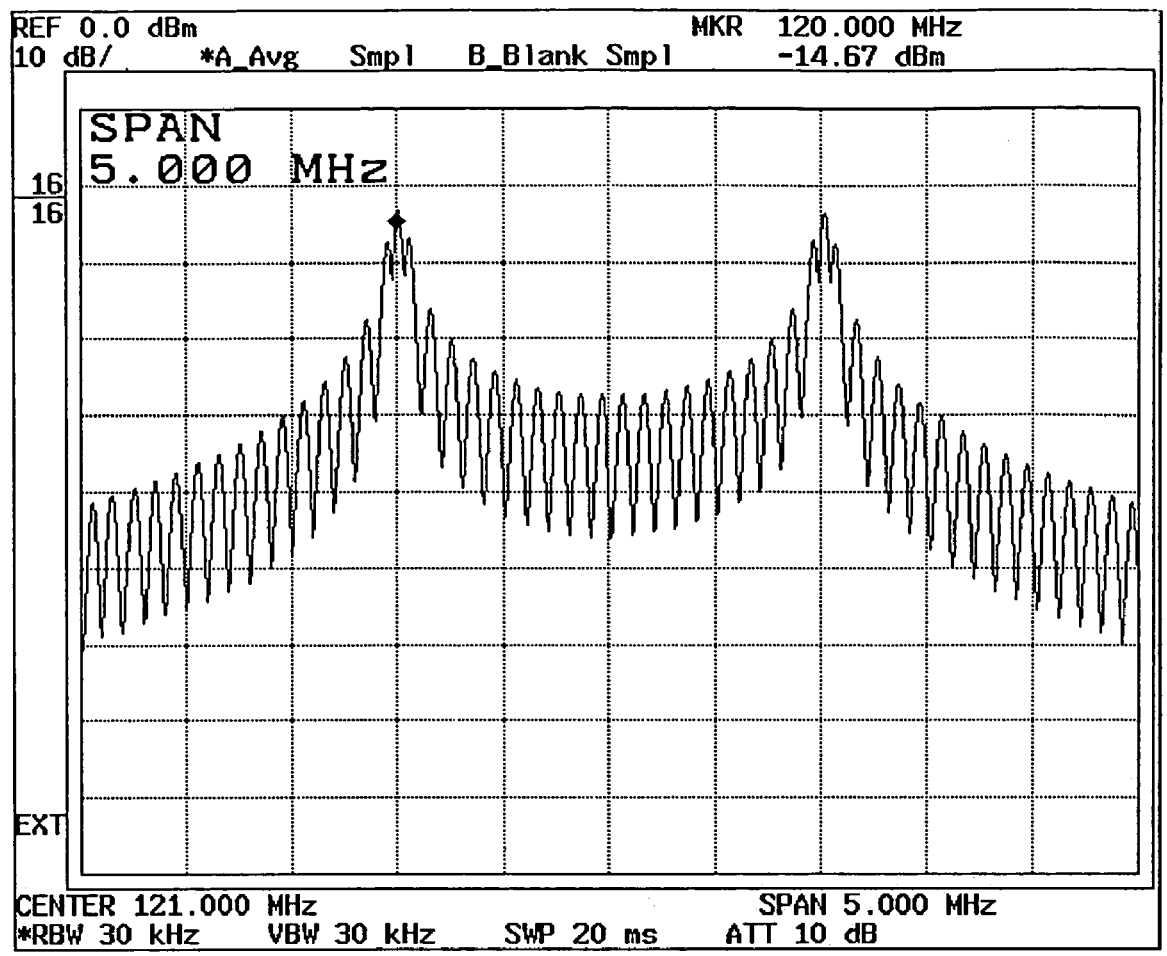
FIG. 10 illustrates another exemplary frequency plot showing two distinct peaks at F1 and F2 surrounded by sidebands in a FSK application.

FIG. 10 illustrates another exemplary Fourier spectrum of a DDS utilized for FSK applications that generates two frequencies F1 at 120 MHz and F2 at 122 MHz, and the frequency is switched between F1 and F2 at a 10 us rate (100 kHz). Again, the equation $|F1-F2|<<\pi/T$ is not satisfied, and thus the two desired peaks will appear at 120 MHz and one at 122 Mhz along with numerous sidebands.

Note that this is completely different from the present invention, wherein the frequencies are very close together compared to FSK applications and the equation $|F1-F2|<<\pi/T$ is satisfied, creating a single peak at the time-weighted average of F1 and F2, plus sidebands that are an artifact of switching at a period of T. Unlike the two peaks in FSK applications, the single peak generated in embodiments of the present invention does not carry information, but is rather used as a high-purity, high-resolution frequency source.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for generating a high purity reference signal with high frequency resolution, comprising:
   selecting N frequencies F1 through FN to be generated in a pattern of frequencies that repeats with a period of duration T, and selecting N time durations T1 through TN as the durations of F1 though FN respectively during T such that T1+T2+ . . . +TN=T and an absolute value of the largest frequency difference between any two of the frequencies F1 though FN is at least two orders of magnitude less than $\pi/T$;
   selecting N frequency tuning words FTW1 through FTWN representing a phase increment required at each clock period to generate F1 through FN, respectively;
   switching between FTW1 through FTWN for the durations T1 through TN in the repeating pattern of frequencies;
   receiving the switched FTW1 through FTWN and accumulating a total accumulated degree of phase at each clock period; and
   converting the total accumulated degree of phase to generate a representation of the high purity reference signal at each clock period.

2. The method as recited in claim 1, further comprising:
   generating a particular reference signal of frequency Favg by selecting T1 through TN and F1 through FN such that Favg=(T1·F1+T2·F2+ . . . +TN·FN)/(T1+T2+ . . . +TN).

3. The method as recited in claim 1, wherein T1 through TN comprise multiple separate time durations.

4. A method for increasing the frequency resolution of a direct digital synthesizer (DDS) to produce a high purity reference signal, comprising:
   selecting N frequencies F1 through FN to be generated in a pattern of frequencies that repeats with a period of duration T, and selecting N time durations T1 through TN as the durations of F1 though FN respectively during T such that T1+T2+ . . . +TN=T and an absolute value of the largest frequency difference between any two of the frequencies F1 though FN is at least two orders of magnitude less than $\pi/T$;
   selecting N frequency tuning words FTW1 through FTWN representing a phase increment required at each clock period to generate F1 through FN, respectively;
   applying FTW1 through FTWN to the DDS for the durations T1 through TN in the repeating pattern of frequencies; and
   generating the high purity reference signal based on the repeating pattern of frequencies and FTW1 through FTWN.

5. The method as recited in claim 4, further comprising:
   generating a particular reference signal from the DDS of frequency Favg by selecting T1 through TN and F1 through FN such that Favg=(T1·F1+T2·F2+ . . . + TN·FN)/(T1+T2+ . . . +TN).

6. The method as recited in claim 4, wherein T1 through TN comprise multiple separate time durations.

7. An apparatus for generating a high purity reference signal with high frequency resolution, comprising:
   a first storage device for storing N frequency tuning words FTW1 through FTWN representing a phase increment required at each clock period to generate N frequencies F1 through FN, respectively;
   a first storage device controller coupled to the first storage device for controlling the first storage device to generate FTW1 through FTWN in a pattern of frequencies that repeats with a period of duration T, where T1 through TN represent the durations of FTW1 through FTWN respectively during T such that T1+T2+ . . . +TN=T and an absolute value of the largest frequency difference between any two of the frequencies F1 though FN is at least two orders of magnitude less than $\pi/T$;
   a phase accumulator coupled to the first storage device for receiving the generated FTW1 through FTWN and accumulating a total accumulated degree of phase at each clock period; and
   a second storage device coupled to the phase accumulator for converting the total accumulated degree of phase to generate a representation of the high purity reference signal at each clock period.

8. The apparatus as recited in claim 7, the first storage device for storing FTW1 through FTWN corresponding to F1 through FN respectively, and the first storage device controller for controlling the first storage device to generate FTW1 through FTWN having durations T1 through TN respectively, such that the apparatus generates the reference signal with a frequency Favg=(T1·F1+T2·F2+ . . . +TN·FN)/ (T1+T2+ . . . +TN).

9. The apparatus as recited in claim 7, the first storage device controller for controlling the first storage device to generate FTW1 through FTWN having durations T1 through TN respectively, wherein T1 through TN comprise multiple separate time durations.

* * * * *